United States Patent [19]
Keller

[11] Patent Number: 5,597,646
[45] Date of Patent: Jan. 28, 1997

[54] POLYMERIC CABLE AND FABRIC MADE THEREFROM

[75] Inventor: Robert A. Keller, Columbia, S.C.

[73] Assignee: Shakespeare, Columbia, S.C.

[21] Appl. No.: 518,150

[22] Filed: Aug. 23, 1995

Related U.S. Application Data

[62] Division of Ser. No. 224,245, Apr. 7, 1994.

[51] Int. Cl.⁶ .................................................. D03D 3/00
[52] U.S. Cl. .................................... 442/195; 428/374
[58] Field of Search .................................. 428/229, 374

[56] References Cited

U.S. PATENT DOCUMENTS

| | | | |
|---|---|---|---|
| 4,382,987 | 5/1983 | Smart | 428/212 |
| 5,141,811 | 8/1992 | Kawakami et al. | 428/364 |

*Primary Examiner*—Christopher Raimund
*Attorney, Agent, or Firm*—Donald W. Huntley

[57] ABSTRACT

Cable structures comprising at least three thermoplastic polymer filaments are prepared in a single extrusion process and exhibit performance characteristics comparable to cabled yarn constructions. The cables can be used in fabrics such as those used in paper manufacture.

24 Claims, 4 Drawing Sheets

POLYMERIC CABLE AND FABRIC MADE THEREFROM

This is a division of application Ser. No. 08/224,245, filed Apr. 7, 1994, pending.

BACKGROUND OF THE INVENTION

In the preparation of filament structures for a wide variety of applications, it is often desirable to combine a plurality of monofilaments to form a twisted or cabled yarn, for either functional or aesthetic purposes. Typically two or more individual monofilaments are combined by twisting, that is, rotating about their longitudinal axes, creating a plied yarn. The structure resulting from such preparation of two or more plied yarns is identified as a cabled yarn. Despite the benefits that can be obtained through the combination of multiple filaments to form a cabled yarn, it would be desirable to provide constructions which give the benefits of cabled yarns, but without the need to ply the individual filaments and then cable the plied yarns.

SUMMARY OF THE INVENTION

The present invention provides a thermoplastic cable comprising at least 2 polymeric filaments, each filament having a cross-sectional configuration that is bilaterally symmetrical, and fused to at least one adjacent polymeric filament along about from 1 to 100% of its perimeter.

The present invention further provides woven fabrics having machine and transverse direction thermoplastic filaments in which at least about 10% of the filaments and at least one of the machine and transverse directions are cable structures as defined above.

The present invention also provides a process for the preparation of thermoplastic cable structures comprising extruding at least two polymeric filaments through a spinnerette in the molten state, fusing each filament through die swell to at least one adjacent filament along about from 1–100% of its perimeter, and orienting the resulting structure by drawing the thermoplastic cable structure about from 3 to 7 times its original length.

DETAILED DESCRIPTION OF THE INVENTION

The filament structures of the present invention can be prepared from a wide variety of thermoplastic polymers. Representative polyesters which can be used include polyethylene terephthalate, polybutylene terephthalate, and poly(cyclohexanedimethylene terephthalate/isophthalate) (PCTA). Representative polyamides which can be used include cyclic, aromatic and aliphatic polyamides, and copolymers of polyamides of fiber-forming molecular weight having a relative viscosity generally between about 25 and 270 as determined by ASTM D-789. These polyamides include, for example, poly(caprolactam) (nylon 6), cyclic polyamides, poly(undecanoamide) (nylon 11), poly(hexamethylene adipamide) (nylon 66), poly(hexamethylene decanoamide) (nylon 610), and poly(hexamethylene dodecanoamide) (nylon 612). Polyamide copolymers and polymer blends can also be used, such as those prepared from nylon 6 and nylon 66, and nylon 11. Of these polyamides, nylon 66, nylon 610 and nylon 6 have been found to be particularly satisfactory for use in paper machine clothing. For those applications that involve high temperature applications, polyphenylene sulfide (PPS), PCTA, and PEEK are preferred. Elastomeric polymers can also be used in the present invention.

The polymers can, as will be recognized by those skilled in the art, contain a wide variety of additives typically used in the preparation of monofilaments to modify the appearance and performance characteristics, such as anti-oxidants, dyes, pigments, antistatic agents and ultraviolet stabilizers.

The filament structures are prepared by extruding, through a die, at least 2 individual filaments of thermoplastic polymers around a single axis. The structures of present invention generally comprise from 2 to 48 component filaments, and preferably at least 3 filaments. Those structures having from 3 to 24 filaments have been found to be particularly satisfactory.

Figure 1:
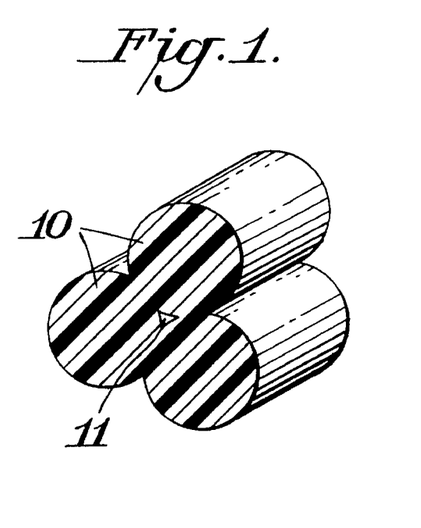
FIGS. 1 and 2 are cross-sectional representations of filament structures of the present invention.
Figure 2:
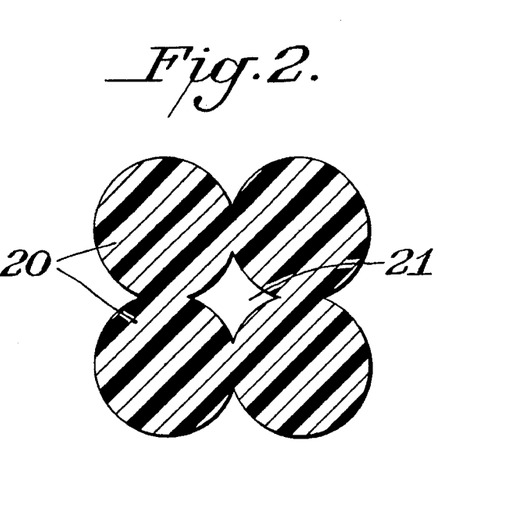

The filaments that make up the present structures are arranged about a single axis. That axis can itself be a filament or a void. The arrangement illustrated in FIG. 1, which is a cross-sectional view of a cable structure of the present invention, shows a cable having three filaments and a central void. FIG. 2 shows a similar arrangement with four capillaries, resulting in a central void.

Figure 3:
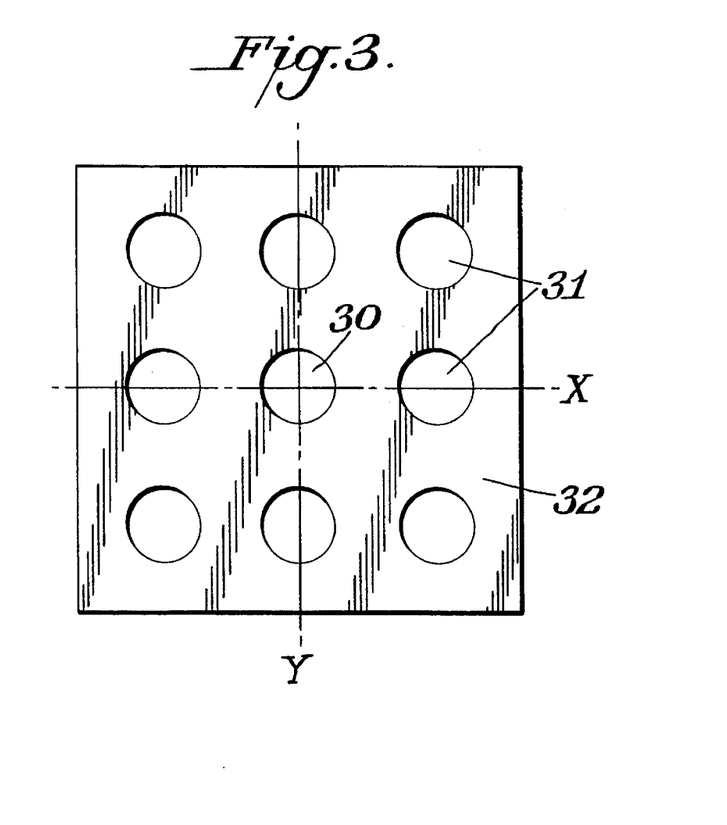
FIGS. 3–10 are planar views of representative extrusion dies which can be used for the preparation of the filament structures of the present invention.

In the present structures, the component filaments are preferably substantially equidistant from each other within a given ring. Thus, FIG. 3 illustrates a die for a cable of nine filaments, in a square configuration, and shows a central die aperture 30 surrounded by a square of eight apertures 31 which are equidistant from each other.

Figure 4:
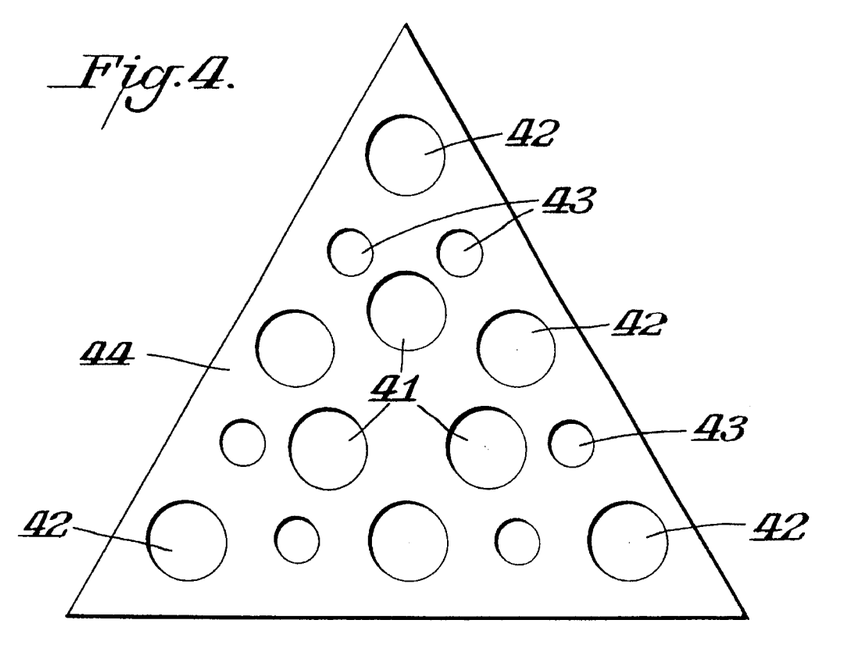

In general, the component filaments will have the same cross-sectional diameter, although this is not always the case. FIG. 4, for example, illustrates a triangular die configuration for a cable structure made up of fifteen filaments, including three central filaments 41. The outer filaments comprise larger filaments 42, which are the same size as the inner filaments. However, the structure also includes smaller apertures 43, which result in two sizes of filament in the cable structure.

Figure 5:
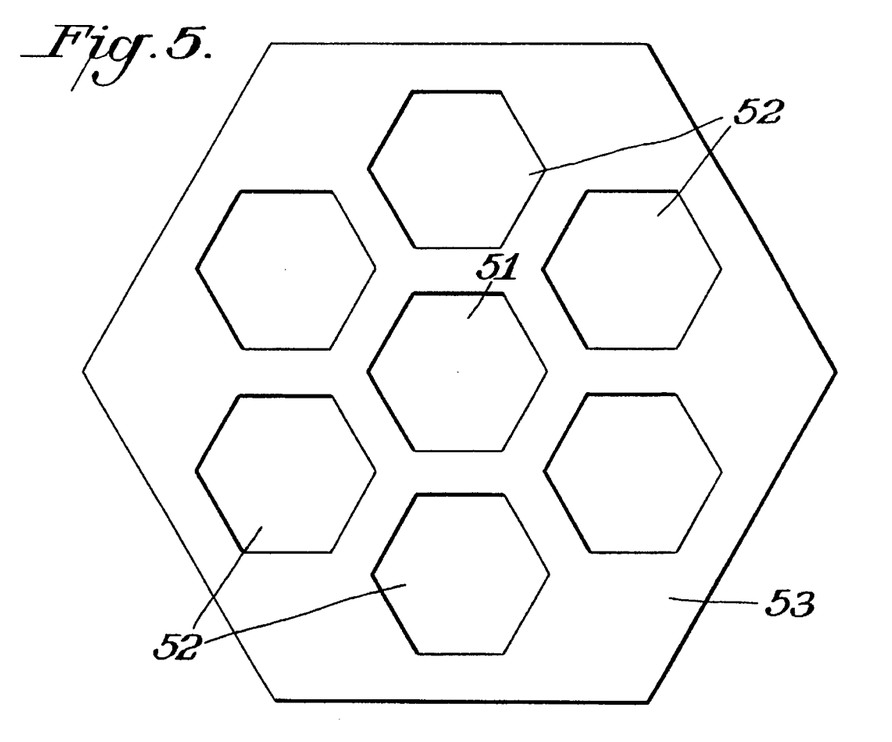

While the filaments in the present cable are generally circular in cross-section, other geometric shapes can be used. In FIG. 5, for example, a die for filaments having hexagonal cross-section is shown. As previously noted, the cross-sectional configuration of the filament in the cable structure retains its bilateral symmetry. Thus, in the seven-strand cable resulting from the extrusion die illustrated in FIG. 5, the central filament 51 will have 100% of its perimeter fused to the filaments resulting from exterior apertures 52.

Figure 6:
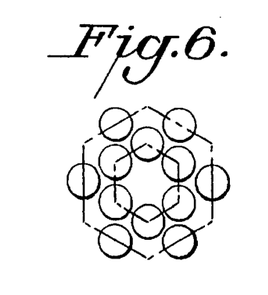
Figure 7:
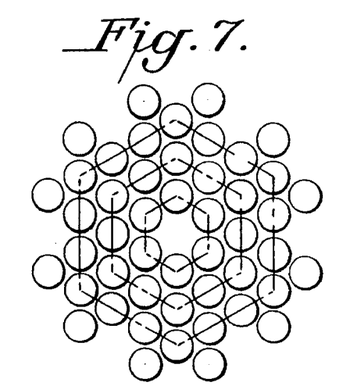

Cables comprising larger numbers of filaments can be prepared from dies illustrated in FIGS. 6 and 7, which respectively illustrate 12 and 48 apertures. With such larger constructions, the members of each subsequent ring are preferably substantially equidistant from each other. It is especially preferred that the members of a given ring are equidistant from the adjacent inner or outer ring or polygon. It is also preferred that, in larger constructions, a junction pattern be replicated from the innermost to the outermost portions of the cable, so that the individual filaments can be uniformly bonded not only to adjacent filaments within a ring of filaments, but also to the rings which are positioned within and outside of the particular ring of filaments. Particularly advantageous is the recurring hexagonal or triangular configuration illustrated in FIGS. 6 and 7, in which each filament is substantially equidistant to its neighbor within the ring and its neighbor in the next inner and next outer ring of filaments. In FIGS. 6 and 7, guidelines are drawn to illustrate the hexagonal configuration of the apertures.

Figure 8:
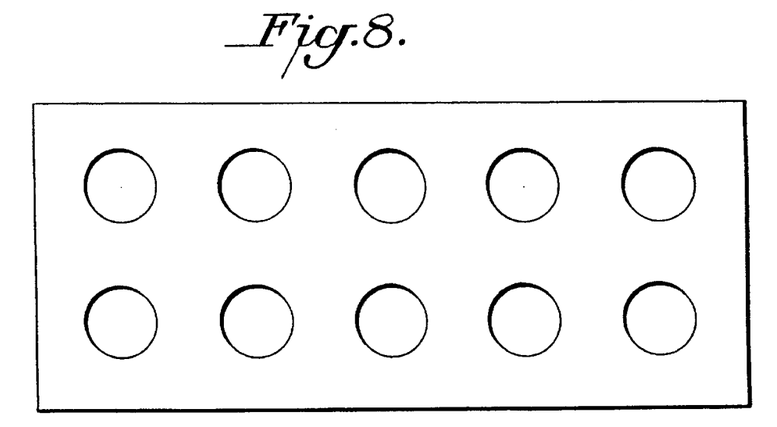
Figure 9:
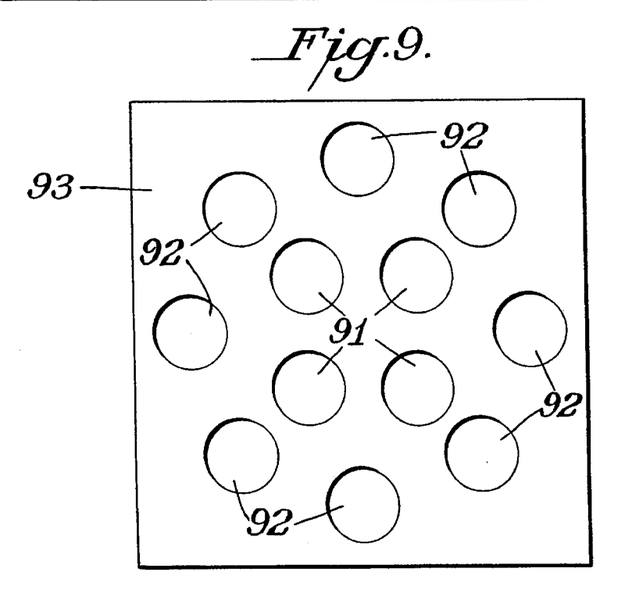
Figure 10:
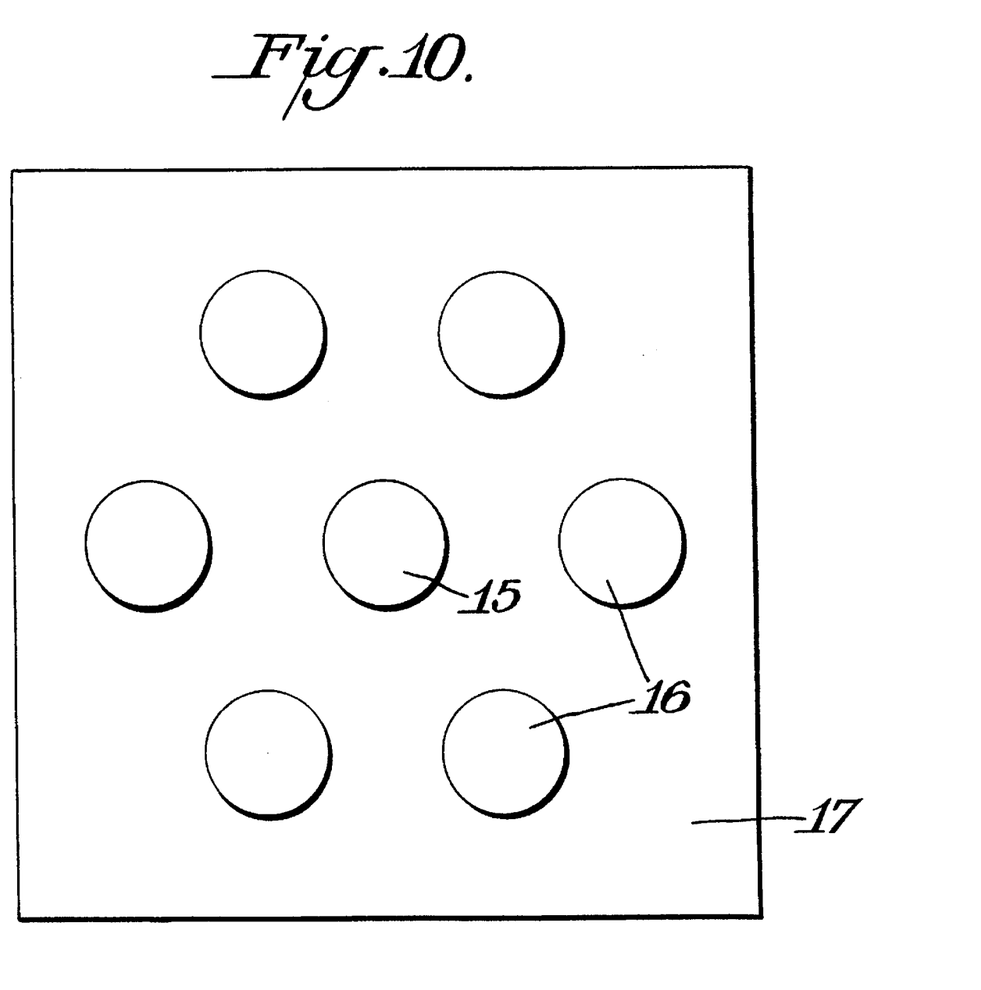

The present invention is readily adapted to the preparation of either substantially round cable structures or flat tape structures. A die for a tape or ribbon structure is illustrated in FIG. 8. Still another configuration for a cable die is shown in FIG. 9, showing a die face having twelve apertures comprising central apertures 91 arranged in the shape of a square with peripheral apertures 92 arranged in a circular configuration. The apertures, and the filaments in the cable resulting from this extrusion die, are substantially equidistant within the square and the circle, respectively. Still another representative die configuration is shown in FIG. 10, which illustrates a die face that can be used for the preparation of cable having seven filaments, including an aperture for central filament 11 and peripheral filaments 12. In this construction, the six filaments in the outer ring are substantially equidistant from each other and also from the filament resulting from central aperture 11.

After extrusion from the die, the individual filaments fuse or bond together through die swell, while still in a molten or plastic state, to at least one adjacent filament using conventional extrusion practices. Each filament has a cross-sectional configuration that is bilaterally symmetrical. For example, a typical round filament, even after bonding to the adjacent filament, will substantially retain its individual round cross-sectional shape. Non-circular shapes can also be used. For example, a monofilament can be prepared in a variety of geometric shapes, such as square, pentagonal, hexagonal or octagonal shapes, by extruding from a spinnerette of the corresponding shape. Regardless of the particular cross-sectional shape used for the filament as extruded from the spinnerette, the individual filament surprisingly retains its extruded configuration on bonding with adjacent strands. Thus, the monofilament retains the bilateral symmetry that is characteristic of circular or geometric shapes on extrusion.

The extent of the fusion of each filament with at least one adjacent filament will vary with the cross-sectional shape, diameter and polymer type of the filament, as well as the configuration of the resultant yarn structure, and generally will be about from 1 to 100% of the perimeter. With filaments having a circular cross-sectional shape, the percentage of the perimeter fused to adjacent strands will generally be about from 1 to 60% of the perimeter. By contrast, with polygonal cross-sectional shapes, entire sides of the polygon can be fused to adjacent component filaments, and the fused perimeter can represent 100% for example, with square or hexagonal filaments.

The diameter of the individual filaments from which the present cable structures are prepared can vary widely, depending on the particular application. In general, however, each component filament will have a diameter of about from 1 to 50 mils. While the individual filaments are generally the same size, the cable structures can also include various diameters or shapes within one structure.

In the preparation of the present structures, the polymer swells upon exit from the spinnerette, combining the individual filaments. Then the resultant structure is passed into a quench medium such as water, after which it is oriented by drawing. While the particular draw ratio will necessarily depend on the specific polymer used, typically a monofilament is drawn 3 to 7 times the original length of the monofilament, and preferably about from 3.5 to 5 times its original length. The drawing can be carried out in multiple stages, and is generally carried out in two or three stages for optimum performance characteristics.

In the extrusion of the present cable structures, after exiting from the spinnerette, the individual filaments will typically swell from internal forces generated within the spinnerette, to cause the individual filaments to fuse. The extent of the swelling will depend on the particular polymer and the extrusion conditions used, as will be evident to those skilled in the art. In any case, the swelling of the filament after exiting the die generally will be less than about 200% of the overall diameter of the filament.

The spacing between and among the spinnerettes is adjusted based on the polymer used, the extrusion conditions, and the length-to-diameter ratio of the spinnerette, so that the swell of the molten polymer upon exiting the spinnerette will result in a fusion of the adjacent filaments after exiting the die along about from 1 to 100% of the perimeter of each filament.

It has been surprisingly found that the structures of the present invention, although prepared from common thermoplastic polymers, exhibit exceptional resiliency when subjected to lateral deforming forces. For example, with a three or four component filament structure, formed from polyamide, each strand of the filament structure will deflect to the plane to which it is pressed, and, upon removal of the compressing force, will resume its initial trilateral or quadrilateral configuration. The filament structures of the present invention can be used in a wide variety of applications, corresponding to those in which cabled yarns were previously used. Such applications include papermaker's fabrics, textile fabrics, filtration fabrics, geotextiles, sewing thread, and any application where cabled yarns are used. Compared to a single monofilament of comparable denier with a round cross section, the polymeric cables of the present invention exhibit markedly improved properties, including loop tenacity and squirrel cage abrasion. The performance of these cables is particularly surprising in view of the fact that the cables are substantially untwisted.

The cable structures can be used effectively in the preparation of paper machine fabrics. These fabrics are commonly used to transfer and dewater paper sheet in the course of its manufacture. Cabled monofilament yarns are commonly used in these woven structures, and the present cables can be effectively used in such weaving operation, comprising, for example, at least about 10% of the filaments in at least one of the machine and transverse directions in the fabric. These cables provide an effective void area in such paper machine fabric, resist compaction and result in a smooth sheet finish. The cable of the present invention provides these benefits over previously known cable structures without the twisting and cabling procedures normally required for the preparation of cable from individual filaments.

The present invention is further illustrated by the following examples. In these examples, the filaments were tested in a squirrel cage apparatus which consisted of twelve equally spaced carbon steel bars in a cylindrical configuration. The bars had a diameter of 3.1 mm and a length of 60.5 cm, and the cage diameter was 26.0 cm. In the course of the test, the cage was rotated at 160 rpm, with the test filament draped over the cage with a 500 gram weight at the end. In the course of testing, at least five samples of the test filament are cut, having a length long enough to go over the cage, but not so long as to permit the weights at the ends of the test lines to drag on the base. The end of each test filament not attached to the weight is attached to a hook at the rear of the machine. The test filaments are draped to extend over the cage, and positioned to depress microswitch counter levers on the apparatus. The cage is rotated at 160 rpm and the cycles to break during the course of the test are determined. The initial and retained tensile strength of each example is tested using an Instron tensile test apparatus to measure the initial and retained tensile strength, on the bases of which the percent retention is determined.

EXAMPLES 1–5 and COMPARATIVE EXAMPLE A and B

In Examples 1 and 2, nylon 6 was melt extruded through a spinnerette having three apertures formed therein each having a diameter of 0.039". The apertures were uniformly placed around a center axis in the die face. The apertures were spaced from the adjacent apertures by a center to center distance of 0.042 and 0.044 inches in Examples 1 and 2, respectively. The filaments were extruded at temperatures of from 490° to 520° F. After exiting from the die face, each of the three filaments was fused through die swell to its two adjacent component filaments along about 30% of its perimeter. The resultant structure was then passed into a quench bath maintained at approximately 80° F. The quench bath was approximately 1.5 inches below the die orifice.

The resulting cable structures were then oriented by drawing in two stages to 4.35 times their original length. The deniers of the resulting filament structures are noted in Table I. Inspection of a cross section of the structure confirmed that each fused filament in the structure had a substantially circular cross sectional shape.

In Comparative Example A, the general procedure of Example 1 was repeated, except that a single strand was extruded, quenched and oriented having a diameter of 19.0 mils, similar to but lower than the overall denier of the products of Example 1 and 2.

The filaments were evaluated according to standard procedures for physical and performance characteristics. The results are summarized in Table I.

In Examples 3 to 5 and Comparative Example B, the general procedure used for Examples 1 and 2 and Comparative Example A was repeated, except that the polymer used was nylon 610 for Example 3 and Comparative Example B and nylon 66 for Examples 4 and 5. The results are also summarized in Table I.

Preparation of cables was also attempted, using the general procedures of Examples 1 and 2, except that the center-to-center spacing between the apertures in the dies was 0.049, 0.054, and 0.059 inches. The resulting structures did not exhibit the required fusion among the filament components.

EXAMPLES 6 to 20 and COMPARATIVE EXAMPLES C, D and E

In Examples 6 to 10, cables were produced from nylon 66 by extruding through four round apertures having a diameter of 0.039 inches. The center-to-center spacing of the apertures was as follows:

| Example | Aperture Spacing |
|---------|------------------|
| 6       | .041             |
| 7       | .042             |
| 8       | .043             |
| 9       | .044             |
| 10      | .047             |

In Examples 11–20, cables were produced using the same extrusion dies as in Examples 6 to 10. Nylon 66 was used in Examples 11–15 and nylon 610 was used in Examples 16–20.

The cable structures of Examples 6–20 were compared, in Comparative Examples C, D and E, with a traditional nylon 6 8×2×2 cable; that is, cable prepared from 8 mil (0.008 inch) monofilament by first twisting two monofilaments together to form a plied yarn and then twisting two of the resulting plied yarns together to form a four-strand cabled yarn. The resulting 8×2×2 cabled yarns, as can be seen from Tables II, III, and IV, were equivalent in denier to the examples of the present invention.

TABLE I

| EXAMPLE PROPERTY | A NYLON 6 | 1 NYLON 6 | 2 NYLON 6 | B NYLON 610 | 3 NYLON 610 | 4 NYLON 66 | 5 NYLON 66 |
|---|---|---|---|---|---|---|---|
| Denier | 1935 * | 2195 * | 2055 * | 1991 * | 2125 * | 2210 * | 2264 * |
| Tensile Strength, lbs. | 26.20 (.31) | 21.08 (.26) | 20.96 (.59) | 16.14 (.91) | 25.18 (.52) | 22.10 (.17) | 21.74 (.14) |
| Tenacity, gpd | 6.15 (.07) | 4.36 (.06) | 4.63 (.13) | 3.68 (.21) | 5.38 (.11) | 4.54 (.03) | 4.36 (.03) |
| Elongation at Break, % | 35.48 (1.59) | 35.76 (1.25) | 31.58 (3.87) | 19.88 (1.40) | 29.04 (2.20) | 31.45 (.59) | 31.90 (1.43) |
| Elongation at 3.0 gpd, % | 16.64 (.68) | 13.36 (.24) | 13.32 (.37) | 15.50 (.14) | 14.80 (.19) | 17.18 (.15) | 17.60 (.50) |
| Loop Strength, lbs. | 15.60 (1.83) | 32.68 (3.32) | 35.68 (2.63) | 3.71 (2.36) | 17.72 (1.79) | 30.08 (2.27) | 27.24 (2.86) |
| Loop Tenacity, gpd | 3.66 (.43) | 6.76 (.69) | 7.88 (.58) | .81 (.59) | 3.78 (.38) | 6.18 (.46) | 5.46 (.58) |
| Shrinkage at 350 F., % | 16.98 (.18) | 9.6 (.15) | 10.94 (.12) | 4.40 (.09) | 12.86 (.14) | 4.74 (.30) | 4.74 (.14) |
| Sandpaper Abrasion, Dry Cycles to Failure | 41 (8.7) | 97 (5.9) | 103 (9.9) | 63 (16.1) | 77 (1.4) | 125 (5.3) | 100 (17.4) |
| Sandpaper Abrasion, Dry | .021 | .044 | .050 | .032 | .036 | .057 | .044 |

TABLE I-continued

| EXAMPLE PROPERTY | A NYLON 6 | 1 NYLON 6 | 2 NYLON 6 | B NYLON 610 | 3 NYLON 610 | 4 NYLON 66 | 5 NYLON 66 |
|---|---|---|---|---|---|---|---|
| Cycles to Failure per Denier | (.005) | (.003) | (.005) | (.008) | (.007) | (.002) | (.007) |
| Sandpaper Abrasion, Wet Cycles to Failure | 25 (4.5) | 80 (13.7) | 80 (8.0) | 56 (5.8) | 44 (18.5) | 93 (54.4) | 72 (4.8) |
| Sandpaper Abrasion, Wet Cycles to Failure per Denier | .013 (.003) | .036 (.006) | .039 (.004) | .028 (.003) | .021 (.009) | .042 (.025) | .032 (.002) |
| Squirrel Cage Abrasion, Dry Cycles to Failure | 168314 (29682.5) | 234828 (37990.0) | 213809 (57056.2) | 88075 (43270.5) | 210763 (91628.2) | 99606 (23305.9) | 684871 (28431.0) |
| Squirrel Cage Abrasion, Dry Cycles to Failure per Denier | 87 (15.3) | 107 (17.3) | 104 (27.8) | 44 (21.7) | 99 (43.1) | 45.07 (10.55) | 302.50 (12.56) |
| Squirrel Cage Abrasion, Wet Cycles to Failure | 174044 (80287.4) | 290846 (21802.7) | 193628 (125189.7) | 270481 (112229.4) | 170148 (133554.7) | 247488 (151798.4) | 303453 (110545.3) |
| Squirrel Cage Abrasion, Wet Cycles to Failure per Denier | 90 (41.5) | 133 (9.9) | 94 (60.9) | 136 (56.4) | 80 (62.8) | 112 (68.7) | 134 (48.8) |

Standard Deviations in parentheses
*Standard Deviation not available

TABLE II

| EXAMPLE PROPERTY | C NYLON 6 | 6 NYLON 66 | 7 NYLON 66 | 8 NYLON 66 | 9 NYLON 66 | 10 NYLON 66 |
|---|---|---|---|---|---|---|
| Denier | 1367 (5.0) | 1680 * | 1613 * | 1640 * | 1651 * | 1652 * |
| Tensile Strength, lbs. | 15.43 (.43) | 16.51 (.29) | 15.71 (.18) | 16.02 (.28) | 16.12 (.39) | 16.18 (.31) |
| Tenacity, gpd | 5.12 * | 4.46 * | 4.42 * | 4.43 * | 4.43 * | 4.45 * |
| Elongation at Break, % | 35.44 (2.21) | 31.10 (2.64) | 29.16 (2.20) | 29.49 (2.77) | 29.86 (4.52) | 31.90 (2.69) |
| Elongation at 1.75 gpd, % | 14.16 (.30) | 8.67 (.10) | 1.75 (.04) | 8.71 (.09) | 8.87 (.16) | 8.85 (.08) |
| Initial Modulus, gpd | 10.26 (.34) | 33.44 (.94) | 97.64 (1.83) | 31.05 (.52) | 32.74 (1.12) | 32.65 (.83) |
| Loop Strength, lbs. | 17.86 (2.42) | 25.92 (2.72) | 22.63 (1.95) | 22.80 (1.20) | 25.73 (1.31) | 24.68 (2.47) |
| Loop Tenacity, gpd | 5.93 * | 7.00 * | 6.37 * | 6.31 * | 7.08 * | 6.78 * |
| Shrinkage at 350 F., % | 8.45 (.27) | 3.40 (.13) | 3.10 (.13) | 3.00 (0) | 2.90 (.13) | 3.05 (.11) |
| Shrinkage at 392 F., % | 5.50 (.18) | 5.00 (0) | 4.60 (.14) | 4.40 (.14) | 4.65 (.13) | 4.50 (.18) |
| Shrinkage at 400 F., % | 18.95 (.11) | 5.85 (.29) | 5.30 (.21) | 5.15 (.13) | 5.50 (0) | 5.05 (.11) |
| Flexural Modulus, gpd | 2.40 (.38) | 24.79 (2.08) | 24.35 (3.04) | 20.10 (2.06) | 24.67 (2.64) | 25.65 (2.15) |
| Sandpaper Abrasion, Dry Cycles to Failure | 6 (3.3) | 90 (9.0) | 83 (11.5) | 86 (7.8) | 86 (11.5) | 87 (9.1) |
| Sandpaper Abrasion, Dry Cycles to Failure per Denier | .0044 (.0024) | .0536 (.0054) | .0515 (.0071) | .0524 (.0048) | .0521 (.0070) | .0527 (.0055) |
| Sandpaper Abrasion, Wet Cycles to Failure | 6 (1.0) | 36 (2.8) | 47 (3.7) | 49 (4.0) | 44 (5.0) | 43 (6.9) |
| Sandpaper Abrasion, Wet Cycles to Failure per Denier | .0044 (.0007) | .0214 (.0017) | .0291 (.0023) | .0299 (.0024) | .0267 (.0030) | .0260 (.0042) |

Standard Deviations in parentheses
*Standard Deviation not available

TABLE III

| EXAMPLE PROPERTY | D NYLON 6 | 11 NYLON 610 | 12 NYLON 610 | 13 NYLON 610 | 14 NYLON 610 | 15 NYLON 610 |
|---|---|---|---|---|---|---|
| Denier | 1367 (5.0) | 1197 * | 1182 * | 1232 * | 1164 * | 1180 * |
| Tensile Strength, lbs. | 15.43 (.43) | 16.45 (.30) | 15.85 (.29) | 16.12 (.49) | 16.11 (.43) | 15.93 (.24) |
| Tenacity, gpd | 5.12 * | 6.24 * | 6.09 * | 5.94 * | 6.28 * | 6.13 * |
| Elongation at Break, % | 35.44 (2.21) | 31.41 (2.65) | 28.86 (2.82) | 30.06 (4.53) | 31.96 (4.63) | 30.48 (1.80) |
| Elongation at 1.75 gpd, % | 14.16 (.30) | 8.64 (.12) | 1.69 (.04) | 1.63 (.04) | 8.93 (.14) | 8.66 (.11) |
| Initial Modulus, gpd | 10.26 (.34) | 34.03 (.68) | 98.90 (3.26) | 102.00 (2.30) | 32.02 (1.30) | 33.90 (.81) |

TABLE III-continued

| EXAMPLE PROPERTY | D NYLON 6 | 11 NYLON 610 | 12 NYLON 610 | 13 NYLON 610 | 14 NYLON 610 | 15 NYLON 610 |
|---|---|---|---|---|---|---|
| Loop Strength, lbs. | 17.86 (2.42) | 20.59 (1.73) | 18.80 (3.13) | 20.00 (1.49) | 19.14 (.81) | 18.99 (3.03) |
| Loop Tenacity, gpd | 5.93 * | 7.81 * | 7.22 * | 7.37 * | 7.47 * | 7.31 * |
| Shrinkage at 350 F., % | 8.45 (.27) | 6.2 (.20) | 6.4 (.41) | 6.2 (.12) | 6.2 (.22) | 6.7 (.27) |
| Shrinkage at 392 F., % | 5.50 (.18) | 10.5 (0) | 10.8 (.28) | 11.0 (.21) | 11.4 (.32) | 11.2 (.43) |
| Shrinkage at 400 F., % | 18.95 (.11) | 12.4 (.29) | 12.3 (.20) | 11.8 (.22) | 12.2 (.18) | 11.9 (.14) |
| Flexural Modulus, gpd | 2.40 (.38) | 33.77 (1.85) | 26.20 (3.55) | 24.14 (3.27) | 26.16 (4.36) | 33.89 (3.01) |
| Sandpaper Abrasion, Dry Cycles to Failure | 6 (3.3) | 43 (3.4) | 45 (2.1) | 40 (2.8) | 39 (4.0) | 35 (6.0) |
| Sandpaper Abrasion, Dry Cycles to Failure per Denier | .0044 (.0024) | .0359 (.0028) | .0381 (.0018) | .0325 (.0023) | .0335 (.0034) | .0297 (.0051) |
| Sandpaper Abrasion, Wet Cycles to Failure | 6 (1.0) | 34 (4.7) | 33 (8.6) | 26 (2.7) | 31 (4.6) | 31 (5.8) |
| Sandpaper Abrasion, Wet Cycles to Failure per Denier | .0044 (.0007) | .0284 (.0039) | .0279 (.0073) | .0211 (.0022) | .0266 (.0040) | .0263 (.0049) |

Standard Deviations in parentheses
*Standard Deviation not available

TABLE IV

| EXAMPLE PROPERTY | E NYLON 6 | 16 NYLON 6 | 17 NYLON 6 | 18 NYLON 6 | 19 NYLON 6 | 20 NYLON 6 |
|---|---|---|---|---|---|---|
| Denier | 1367 (5.0) | 1684 * | 1686 * | 1673 * | 1648 * | 1680 * |
| Tensile Strength, lbs. | 15.43 (.43) | 16.61 (1.62) | 18.41 (.47) | 16.76 (.64) | 17.17 (.25) | 16.19 (.34) |
| Tenacity, gpd | 5.12 * | 4.48 * | 4.96 * | 4.55 * | 4.73 * | 4.38 * |
| Elongation at Break, % | 35.44 (2.21) | 28.93 (4.07) | 31.34 (.60) | 29.50 (1.80) | 31.35 (.45) | 30.86 (.93) |
| Elongation at 1.75 gpd, % | 14.16 (.30) | 10.45 (.13) | 10.15 (.21) | 9.21 (.15) | 10.68 (.19) | 3.89 (.19) |
| Initial Modulus, gpd | 10.26 (.34) | 15.20 (.16) | 15.07 (.34) | 14.29 (.25) | 13.83 (.26) | 46.15 (1.15) |
| Loop Strength, lbs. | 17.86 (2.42) | 15.97 (1.81) | 15.23 (2.20) | 11.17 (1.18) | 12.47 (.96) | 14.16 (.30) |
| Loop Tenacity, gpd | 5.93 * | 4.31 * | 4.10 * | 3.03 * | 3.44 * | 3.83 * |
| Shrinkage at 350 F., % | 8.45 (.27) | 6.15 (.22) | 6.10 (.13) | 5.50 (0) | 6.05 (.11) | 6.50 (.17) |
| Shrinkage at 392 F., % | 5.50 (.18) | 12.85 (.65) | 11.55 (.21) | 10.85 (.13) | 11.30 (.21) | 13.10 (.38) |
| Shrinkage at 400 F., % | 18.95 (.11) | 14.25 (.25) | 14.30 (.21) | 12.60 (.13) | 13.55 (.11) | 14.60 (.14) |
| Flexural Modulus, gpd | 2.40 (.38) | 10.69 (1.28) | 10.20 (1.28) | 7.54 (1.06) | 10.69 (1.34) | 10.29 (1.29) |
| Sandpaper Abrasion, Dry Cycles to Failure | 6 (3.3) | 48 (4.4) | 28 (4.7) | 37 (3.4) | 27 (8.7) | 37 (3.6) |
| Sandpaper Abrasion, Dry Cycles to Failure per Denier | .0044 (.0024) | .0285 (.0026) | .0166 (.0028) | .0221 (.0020) | .0164 (.0053) | .0220 (.0021) |
| Sandpaper Abrasion, Wet Cycles to Failure | 6 (1.0) | 23 (3.6) | 21 (3.3) | 18 (1.9) | 15 (3.6) | 39 (22.4) |
| Sandpaper Abrasion, Wet Cycles to Failure per Denier | .0044 (.0007) | .0137 (.0021) | .0125 (.0020) | .0108 (.0011) | .0091 (.0022) | .0232 (.0133) |

Standard Deviations in parentheses
Standard Deviation not available

I claim:

1. A fabric comprising at least one cable structure, the cable structure comprising at least three oriented thermoplastic filaments arranged symmetrically about a central axis, each filament having a cross-sectional shape that is bilaterally symmetrical and wherein each filament is fused to at least one adjacent filament along about from 1 to 100% of its perimeter and wherein the central axis of the cable structure is a void.

2. A fabric of claim 1 which is woven.

3. A fabric of claim 1 wherein the cable has 0 to 48 filaments.

4. A fabric of claim 1 wherein each filament has a substantially circular cross-sectional configuration.

5. A fabric of claim 4 wherein each filament is fused to at least one adjacent filament along about from 1 to 60% its perimeter.

6. A fabric of claim 1 wherein the cable consists essentially of polyamide.

7. A fabric of claim 1 wherein the cable consists essentially of polyester.

8. A fabric of claim 3 wherein the cable has 3 to 24 filaments.

9. A fabric of claim 1 wherein the cable comprises at least four filaments.

10. A fabric of claim 1 wherein each filament has a polygonal cross-sectional configuration.

11. A fabric of claim 10 wherein each filament has a square or hexagonal cross-sectional configuration.

12. A fabric of claim 1 comprising at least 6 filaments arranged in at least one ring.

13. A fabric comprising at least one cable structure of oriented thermoplastic filaments, wherein each filament has a hexagonal cross-sectional shape, the cable structure comprising a central filament and 6 filaments adjacent to the central filament, and wherein substantially 100% of the perimeter of the central filament is fused to the adjacent filaments.

14. A fabric comprising at least one cable structure of oriented thermoplastic filaments, wherein each filament has a square cross-sectional shape, the cable structure comprising a central filament and 8 adjacent filaments, and wherein substantially 100% of the perimeter of the central filament is fused to the adjacent filaments.

15. In a woven, heat set, paper making belt having machine and transverse direction filaments, the improvement wherein at least about 10% of the filaments in at least one of the machine and transverse directions are cable structures comprising at least three oriented thermoplastic filaments, each filament having a cross-sectional shape that is bilaterally symmetrical and wherein each filament is autogeneously bonded to at least one adjacent filament along about from 1 to 100% of its perimeter.

16. A paper making belt of claim 15 wherein the cable has 3 to 48 filaments.

17. A paper making belt of claim 16 wherein the cable has 3 to 24 filaments.

18. A paper making belt of claim 15 wherein the cable comprises at least four filaments.

19. A paper making belt of claim 15 wherein each filament has a substantially circular cross-sectional configuration.

20. A paper making belt of claim 15 wherein each filament is fused to at least one adjacent filament along about from 1 to 60% of its perimeter.

21. A paper making belt of claim 15 wherein each filament has a polygonal cross-sectional configuration.

22. A paper making belt of claim 21 wherein each filament has a square or hexagonal cross-sectional configuration.

23. A paper making belt of claim 23 wherein each filament has a hexagonal configuration, the cable comprising a central filament and 6 filaments adjacent to the central filament, and substantially 100% of the perimeter of the central filament is fused to the adjacent filaments.

24. A paper making belt of claim 22 wherein each filament has a square cross-sectional configuration, the cable comprising 1 central filament and 8 peripheral filaments, and wherein substantially 100% of the perimeter of the central filament is fused to the adjacent filaments.

* * * * *